(12) United States Patent
Greenspan et al.

(10) Patent No.: US 7,296,182 B2
(45) Date of Patent: Nov. 13, 2007

(54) DISASTER RECOVERY FOR PROCESSING RESOURCES USING CONFIGURABLE DEPLOYMENT PLATFORM

(75) Inventors: Alan Greenspan, Northborough, MA (US); Borne Goodman-Mace, Johnson, VT (US); Michael Johnson, Stow, MA (US); Siping Liu, Hopkington, MA (US); Claude Keswani, South Boston, MA (US)

(73) Assignee: Egenera, Inc., Marlborough, MA (US)

( * ) Notice: Subject to any disclaimer, the term of this patent is extended or adjusted under 35 U.S.C. 154(b) by 0 days.

(21) Appl. No.: 11/546,014

(22) Filed: Oct. 10, 2006

(65) Prior Publication Data

US 2007/0088980 A1    Apr. 19, 2007

Related U.S. Application Data

(63) Continuation of application No. 10/431,313, filed on May 7, 2003, now Pat. No. 7,178,059.

(51) Int. Cl.
*G06F 11/00* (2006.01)

(52) U.S. Cl. ............................. 714/13; 714/10; 714/4

(58) Field of Classification Search ............... None
See application file for complete search history.

(56) References Cited

U.S. PATENT DOCUMENTS

| | | | |
|---|---|---|---|
| 4,907,232 A | 3/1990 | Harper et al. |
| 5,996,086 A | 11/1999 | Delaney et al. |
| 6,587,970 B1 | 7/2003 | Wang et al. |
| 6,618,819 B1 | 9/2003 | Adamovits et al. |
| 2002/0156612 A1 | 10/2002 | Schulter et al. |
| 2003/0055919 A1 | 3/2003 | Fong et al. |
| 2004/0054780 A1 | 3/2004 | Romero |
| 2004/0153754 A1 | 8/2004 | Chen et al. |
| 2004/0172574 A1 | 9/2004 | Wing et al. |

*Primary Examiner*—Marc Duncan
(74) *Attorney, Agent, or Firm*—Wilmer Cutler Pickering Hale and Dorr LLP

(57) ABSTRACT

A system and method for disaster recovery for processing resources using configurable deployment platform. A primary site has a configuration of processing resources. A specification of the configuration of processing resources of the primary site is generated. The specification is provided to a fail-over site that has a configurable processing platform capable of deploying processing area networks in response to software commands. Using the specification, software commands are generated to the configurable platform to deploy processing area network corresponding to the specifications.

5 Claims, 8 Drawing Sheets

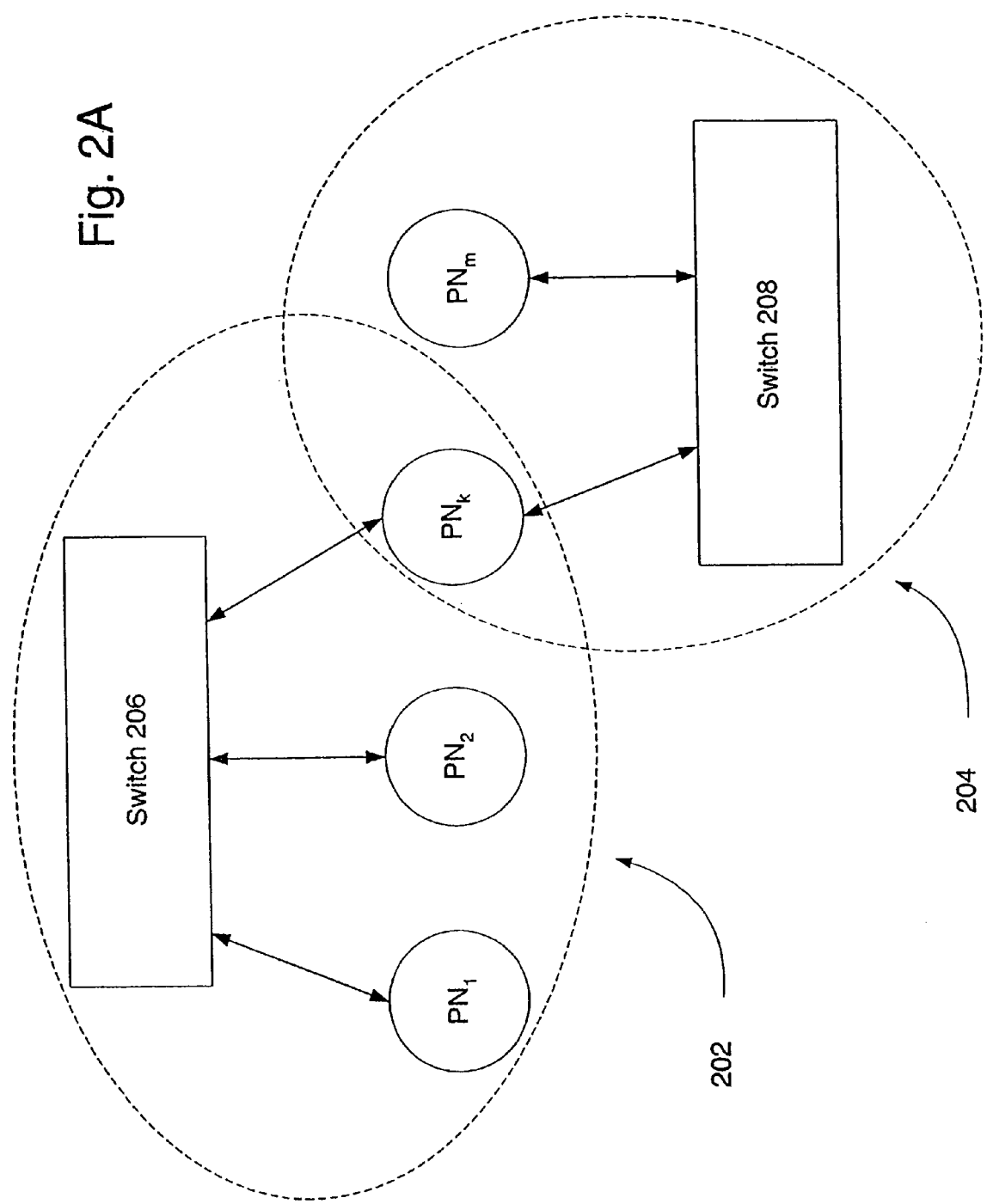

DISASTER RECOVERY FOR PROCESSING RESOURCES USING CONFIGURABLE DEPLOYMENT PLATFORM

BACKGROUND

1. Field of the Invention

The present invention relates to computing systems for enterprises and, more specifically, to disaster recovery systems and techniques for reconfigurable, virtualized processing systems.

2. Discussion of Related Art

FIG. 3 depicts a conventional disaster recovery system. Storage facility 302 is located at a first location, and storage facility 304 is located at a second location, typically remote from the first location. Facility 302 may be considered a primary system and facility 304 may be considered as a secondary or fail-over site. Each facility has an identical copy of the data of interest, e.g., on their respective storage. Any desired updates of data at the primary are also sent to the secondary, e.g., via communication path 306. In this fashion, the primary and secondary facilities may maintain identical copies of data.

If a disaster were to happen at the primary site, e.g., a hurricane, computer operations may fail-over to the secondary site. The secondary site has a host computer 308 waiting to handle such failover requests and is pre-configured with the necessary applications (e.g., those that executed on the primary host 310). The secondary site, including its host 308, may then handle the enterprise's computer operations that used to be handled by the primary. When the primary site recovers, the operations may switch back to the primary site if desired.

FIG. 4 depicts an exemplary, multi-tiered application topology. A firewall 402 acts as an interface to the Internet, for example, to receive various requests therefrom. The firewall 402 communicates with a load balancer 404, which attempts to distribute the processing load on the overall system among a multiplicity of processing nodes. For example, the load balancer may distribute requests among a multiplicity of web servers 406a . . . n. Each web server 406, in turn, may perform some analysis of a task it receives and invoke an appropriate application server 408a . . . n. Each application server 408 may in turn interact with database or file server 410a . . . n. Each of the various entities may be executing on its own respective processing or server node.

As suggested by FIG. 4, modem multi-tiered application topologies may become very complicated. Adding to the complication (though not shown in FIG. 4) are the various hubs, switches, cabling, and the like necessary to create the depicted processing network. Moreover, various versions of software may be executing.

To date, a considerable body of expertise has been developed in addressing disaster recovery with specific emphasis on replicating the data. Processor-side issues have not received adequate attention.

To date, processor-side aspects of disaster recovery have largely been handled by requiring processing resources on the secondary site to be identical to those of the first site and to wait in standby mode. This is complicated and costly, as suggested by the complexity of the multi-tiered architecture. Moreover, modem processor networks are often changed for a variety of reasons. If such a network is a primary site network, then the changes also need to be made to the secondary, or else the enterprise risks that its disaster recovery system will not work as expected.

Platforms have been created recently that facilitate the deployment of processor resources. For example, Egenera, Inc. has provided the Egenera Bladefram platform. This platform has an adaptable, internal architecture (more below) so that processing area networks may be rapidly deployed under the control of software configuration commands. An exemplary architecture of such a system is described in U.S. patent application Ser. No. 10/038,354, filed on Jan. 4, 2002, entitled Address Resolution Protocol System and Method in a Virtual Network, and published on Oct. 24, 2002, which is hereby incorporated by reference in its entirety.

SUMMARY

The invention provides a system and method for disaster recovery for processing resources using configurable deployment platform.

Under one aspect of the invention, a primary site has a configuration of processing resources. Under this aspect of the invention, a specification of a configuration of processing resources of the primary site is generated. The specification is provided to a fail-over site that has a configurable processing platform capable of deploying processing area networks in response to software commands. Using the specification, software commands are generated to the configurable platform to deploy processing resources corresponding to the specifications.

Under another aspect of the invention, the processing resources at the primary site are deployed on a configurable processing platform that is compatible with the configurable processing platform at the fail-over site.

Under another aspect of the invention, a specification is generated to describe the configuration of processing resources at the primary site and it includes configuration state that is specific to the configurable processing platform of the primary site.

Under another aspect of the invention, at least one other site includes processing resources and a specification is generated to describe the configuration of processing resources at the at least one other site. The specification of the configuration of processing resources at the at least one other site is provided to the fail-over site, and at least one of the specifications is used to generate software commands to the configurable platform to deploy processing area network corresponding to the one specification.

Under another aspect of the invention, the processing resources at the primary site include a plurality of independent processing area networks and the specification describes only a subset of the plurality of independent processing area networks.

Under another aspect of the invention, the processing resources at the primary site include a plurality of independent processing area networks and the specification describes all of the independent processing area networks.

Under another aspect of the invention, using the specification to generate commands to deploy processing resources is done in response to the receipt of a fail-over condition.

Under another aspect of the invention, the specification describes a minimum configuration or processing resources at the primary site.

BRIEF DESCRIPTION OF THE DRAWINGS

In the Drawing,

FIGS. 2A-C are diagrams illustrating the communication links established according to one embodiment of the invention;

DETAILED DESCRIPTION

Preferred embodiments of the invention provide a system and method that enable the efficient failover of processing resources to a second, fail-over site. Processing resources and configuration at the primary site are characterized into a specification with a defined set of variables, and the specification is stored in a secure way. The set of information that characterizes the resources (i.e., the resource's "personality") includes information such as the number of processing area networks (PANs) at the primary site, for each such PAN the number of nodes that should be allocated, the network connectivity among processors, storage mappings and the like (more below). The failover site uses a software-configurable platform that allows one or more independent processing networks to be deployed (or instantiated) in response to software commands. For example, certain embodiments may use the platform described in the U.S. patent applications identified above and incorporated by reference. The configuration specification is accessed and used to issue a set of commands on the configurable platform to instantiate processing resources on the failover site consistent with the specification.

Using the above approach, failover processing resources may be rapidly deployed (or instantiated) in response to a disaster or other fail-over condition. In some embodiments, the deployment at the failover site may be made in advance of any failover conditions or disaster. In these situations, the failover resources are instantiated and effectively kept in a standby mode relative to the primary site. These embodiments benefit in that any changes to the primary site's processing resources may be rapidly, accurately and reliably migrated to the failover site. In this fashion, the failover site can more quickly mirror the primary site's processing resources and in a way less susceptible to human error. For example, the enterprise will not need various personnel to understand the configuration at the primary site and re-create such configuration at a remote site, including the various cabling etc. needed for physical deployment of resources.

Exemplary System Architecture and Methods

Figure 5:
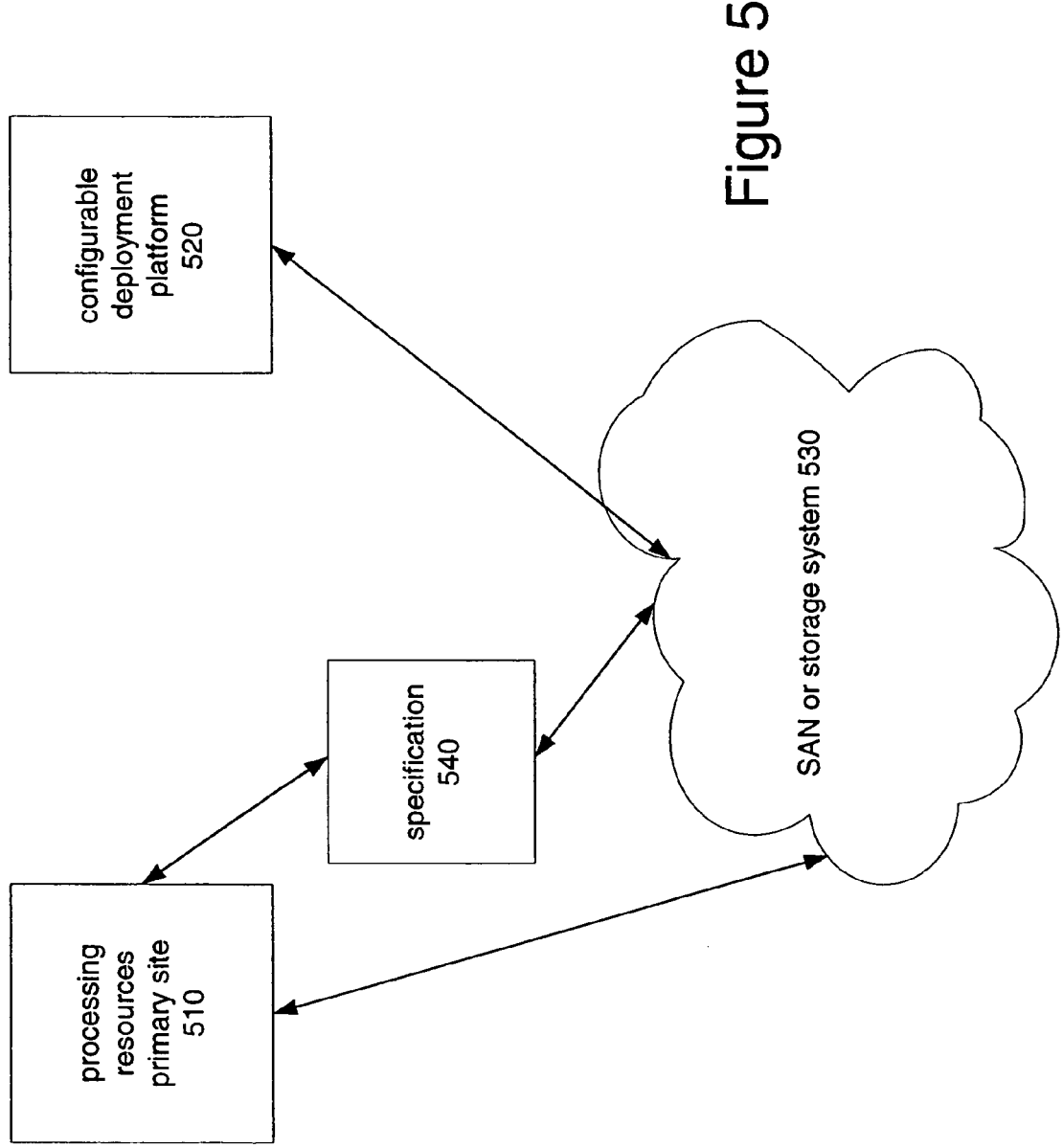
FIG. 5 illustrates a disaster recovery system for processing resources according to certain embodiments of the invention.

FIG. 5 depicts an exemplary system architecture according to certain embodiments of the invention. The system includes a processing resources 510 at a primary site, a configurable platform 520 at a secondary site, a storage area network or analogous storage system 530 (which preferably includes geographically distributed storage having disaster recovery capabilities), and a configuration specification 540 that is to be stored on the SAN 530 in a secure way (consistent with the disaster recovery model of the enterprise).

Figure 4:
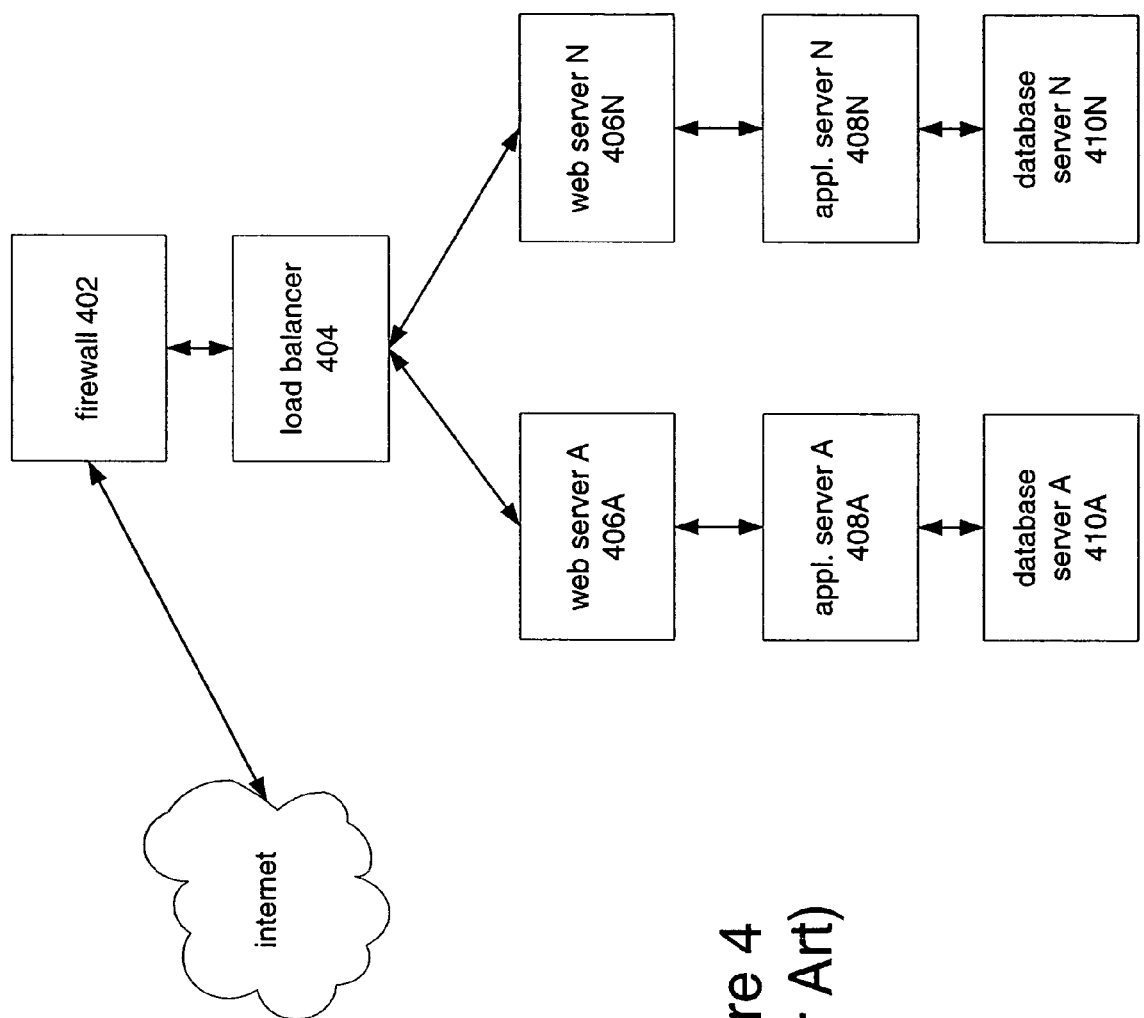
FIG. 4 illustrates a conventional multi-tiered application topology.

The primary site may have one or more PANs such as those depicted in FIG. 4. The networks may be conventionally deployed with physically cabled, interconnected, and powered servers of various types. However, preferred embodiments would realize such PANs on a configurable platform such as those described in the U.S. patent applications identified above and incorporated including ones such as Egenera's BladeFrame platform.

The personality of the resources 510 at the primary site are characterized and specified in a configuration specification 540 (more below). The specification 540 includes the necessary information to properly describe the processing resources 510 at the primary site.

The specification is stored on the SAN 530 in a secure way. For example, it may be saved to the SAN periodically. Alternatively, it may be stored in a remotely mirrored arrangement on the SAN or the like. The actual mechanisms for storing such specification are largely irrelevant to preferred embodiments other than that the approach should preferably be consistent with the disaster recovery model of the enterprise.

The specification 540 may characterize the entire set of processing resources at the primary site. Alternatively, the specification may characterize only certain PANs, clusters, or partitions of the primary site.

Moreover, the specification may be used to precisely describe the actual processing resources at the primary site. Alternatively, the specification may be used to describe a different, but sufficient, set of resources that is expected to be satisfactory for fail-over operation (e.g., perhaps a minimum configuration necessary to support operations).

The actual information specified will depend on the capabilities of the configurable platform and on the platform for the primary resources (i.e., is it deployed conventionally or is it deployed on a configurable platform). Certain embodiments store a predefined set of variables in a predefined format (e.g., using XML to tag the data) to specify the configuration of the primary site.

The specification 530 is accessed and used to instance processing resources at the failover site. Specifically, the configurable platform 520 via appropriate software commands instantiates PANs consistent with the description in the specification 530. In some embodiments, this instantiation may be automated for example parsing the specification and creating the necessary software configuration commands to deploy (or instantiate) the resources at the failover site. In other embodiments, tools (not shown) are used to validate the specification, but actual instantiation is performed with the assistance of an IT administrator. In some contexts, the deployment may be in response to a disaster or failover condition (which may be communicated in many forms). In other contexts, the deployment may be performed in advance of any disaster or failover conditions.

In certain preferred embodiments, the primary resources 510 are deployed on a configurable platform that is compatible (but not necessarily identical) to the platform 520. In these arrangements the specification may include more specific information to facilitate deployment. For example, the specification may include certain information used at the primary to emulate various PANs and which is specific to the general type of configurable platform used. In this fashion, deployment at the failover may be more rapid, as this information will not need to be re-created or generated at the secondary. In contrast, for arrangements that use conventional arrangements at the primary (i.e., with physical networking, cabling and the like), the specification will be more general in nature and will not include emulation- or platform-specific information.

Figure 6:
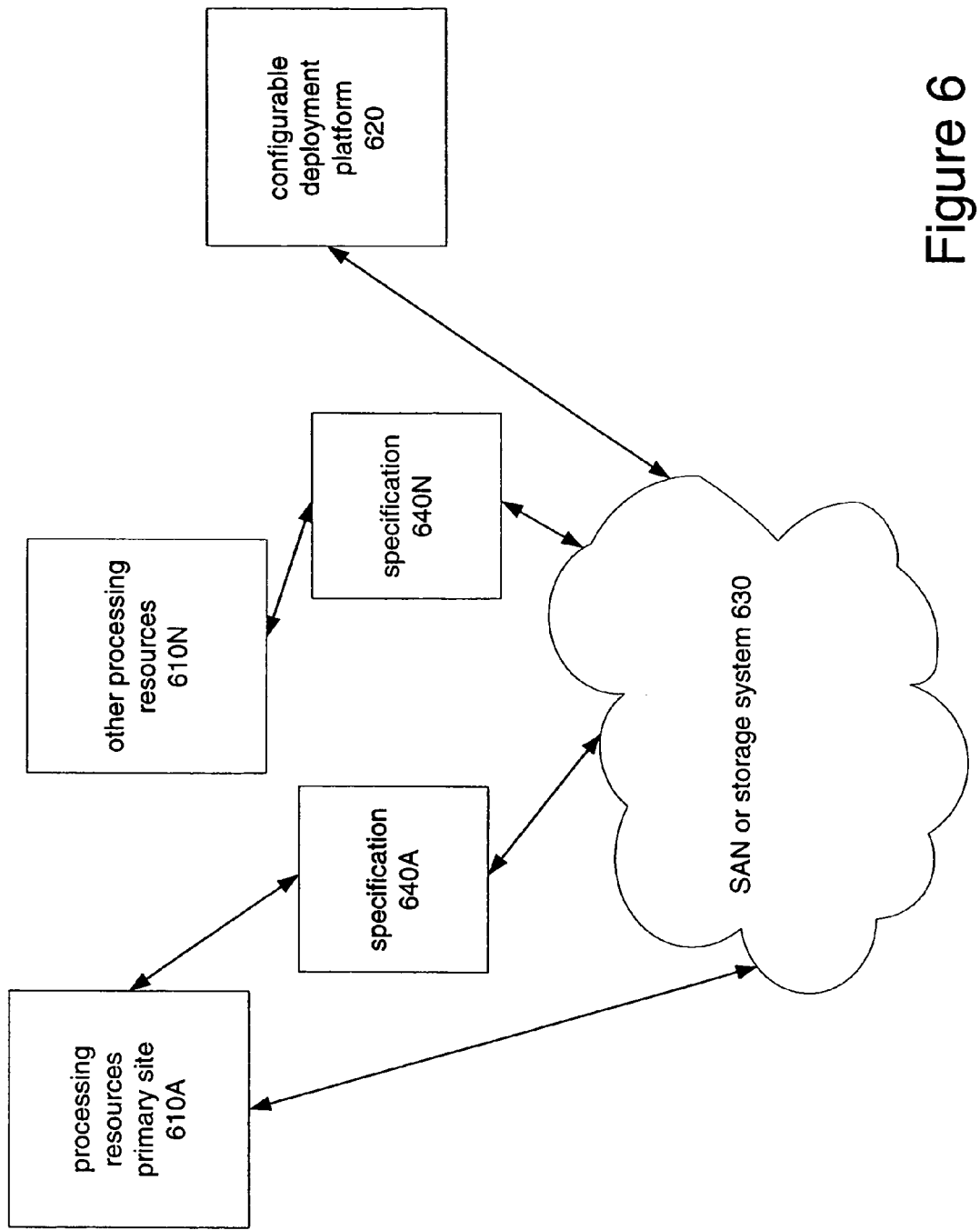
FIG. 6 illustrates a disaster recovery system for processing resources according to certain embodiments of the invention.

FIG. 6 depicts another arrangement according to certain embodiments of the invention. In this arrangement, there is still a failover site with a configurable platform 620 analogous to that described above. However, this failover site may be used in conjunction with multiple production sites of various types. In this fashion, the failover architecture effectively creates an N+1 arrangement of processing resources with N production sites and one failover site to be used to handle disasters or fail-over conditions.

Moreover, the failover site need not necessarily allocate sufficient resources in advance of a failover condition or disaster. Instead, in response to a failover condition or disaster, the failover site may instantiate the processing resources as specified. Preferred configurable platforms 520 include scheduling logic that may, for example, shut down lower priority PANs executing on the platform and instantiate a higher priority PANs to be instantiated to support the failover.

Alternatively, a minimum configuration may be instantiated in advance of any failover condition and upon failover scheduling logic may consult the specification 540 and determine whether more resources may be added and deployed to provide better server for the PAN.

Overview of an Exemplary Configurable Platform for Deploying PANs

As outlined above, preferred embodiments utilize configurable platforms 520 for deploying PANs at the disaster recovery site. Preferably these platforms are like those described in the incorporated U.S. patent applications and/or like Egenera's BladeFrame platform. Moreover, preferred embodiments also utilize configurable platforms at the primary site.

In short, the preferred platforms provide a pool of resources that may be allocated and configured to emulate independent PANs in response to software commands. The commands for example describe the number of processing nodes that should be allocated, their network connectivity, their storage personality and the like. The various networking, cabling, power and the like are effectively emulated and thus permit rapid instantiation of the processing network (as opposed to the complicated and slow physical deployment in conventional approaches).

Figure 1:
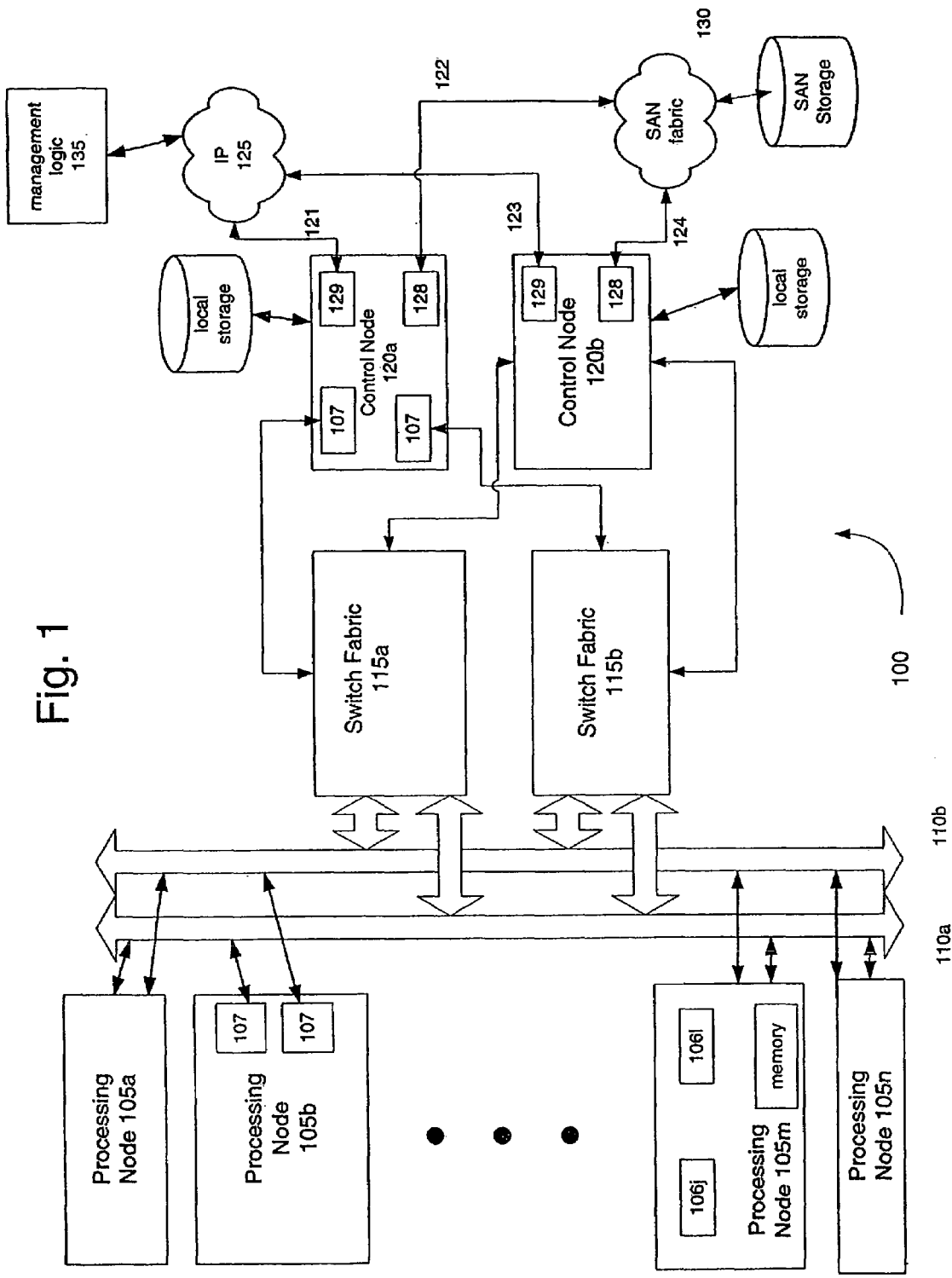
FIG. 1 is a system diagram illustrating one embodiment of the invention.

FIG. 1 depicts an exemplary platform for preferred embodiments of the invention. As outlined below and described in more detail in the incorporated patent applications, preferred platforms provide a system, method and logic through which virtual systems may be deployed through configuration commands. The platform provides a large pool of processors from which a subset may be selected and configured through software commands to form a virtualized network of computers ("processing area network" or "processor clusters") that may be deployed to serve a given set of applications or customer. The virtualized processing area network (PAN) may then be used to execute customer specific applications, such as web-based server applications, e.g., like those depicted at a high level in FIG. 2A-C. The virtualization may include virtualization of local area networks (LANs) or the virtualization of I/O storage. By providing such a platform, processing resources may be deployed rapidly and easily through software via configuration commands, e.g., from an administrator, rather than through physically providing servers, cabling network and storage connections, providing power to each server and so forth.

As shown in FIG. 1, a preferred hardware platform 100 includes a set of processing nodes 105*a-n* connected to a switch fabrics 115*a,b* via high-speed, interconnect 110*a,b*. The switch fabric 115*a,b* is also connected to at least one control node 120*a,b* that is in communication with an external IP network 125 (or other data communication network), and with a storage area network (SAN) 130. A management application 135, for example, executing remotely, may access one or more of the control nodes via the IP network 125 to assist in configuring the platform 100 and deploying virtualized PANs.

Under certain embodiments, about 24 processing nodes 105*a-n*, two control nodes 120, and two switch fabrics 115*a,b* are contained in a single chassis and interconnected with a fixed, pre-wired mesh of point-to-point (PtP) links. Each processing node 105 is a board that includes one or more (e.g., 4) processors 106*j-l*, one or more network interface cards (NICs) 107, and local memory (e.g., greater than 4 Gbytes) that, among other things, includes some BIOS firmware for booting and initialization. There is no local disk for the processors 106; instead all storage, including storage needed for paging, is handled by SAN storage devices 130.

Each control node 120 is a single board that includes one or more (e.g., 4) processors, local memory, and local disk storage for holding independent copies of the boot image and initial file system that is used to boot operating system software for the processing nodes 105 and for the control nodes 106. Each control node communicates with SAN 130 via 100 megabyte/second fibre channel adapter cards 128 connected to fibre channel links 122, 124 and communicates with the Internet (or any other external network) 125 via an external network interface 129 having one or more Gigabit Ethernet NICs connected to Gigabit Ethernet links 121,123. (Many other techniques and hardware may be used for SAN and external network connectivity.) Each control node includes a low speed Ethernet port (not shown) as a dedicated management port, which may be used instead of remote, web-based management via management application 135.

The switch fabric is composed of one or more 30-port Giganet switches 115, such as the NIC-CLAN 1000 and clan 5300 switch, and the various processing and control nodes use corresponding NICs for communication with such a fabric module. Giganet switch fabrics have the semantics of a Non-Broadcast Multiple Access (NBMA) network. All inter-node communication is via a switch fabric. Each link is formed as a serial connection between a NIC 107 and a port in the switch fabric 115. Each link operates at 112 megabytes/second.

In some embodiments, multiple cabinets or chassises may be connected together to form larger platforms. And in other embodiments the configuration may differ; for example, redundant connections, switches and control nodes may be eliminated.

Under software control, the platform supports multiple, simultaneous and independent processing areas networks (PANs). Each PAN, through software commands, is configured to have a corresponding subset of processors 106 that may communicate via a virtual local area network that is emulated over the PtP mesh. Each PAN is also configured to have a corresponding virtual I/O subsystem. No physical deployment or cabling is needed to establish a PAN. Under certain preferred embodiments, software logic executing on the processor nodes and/or the control nodes emulates switched Ethernet semantics; other software logic executing on the processor nodes and/or the control nodes provides virtual storage subsystem functionality that follows SCSI semantics and that provides independent I/O address spaces for each PAN.

Certain preferred embodiments allow an administrator to build virtual, emulated LANs using virtual components, interfaces, and connections. Each of the virtual LANs can be internal and private to the platform 100, or multiple processors may be formed into a processor cluster externally visible as a single IP address.

Under certain embodiments, the virtual networks so created emulate a switched Ethernet network, though the physical, underlying network is a PtP mesh. The virtual network utilizes IEEE MAC addresses, and the processing nodes support IETF ARP processing to identify and associate IP addresses with MAC addresses. Consequently, a given processor node replies to an ARP request consistently whether the ARP request came from a node internal or external to the platform.

FIG. 2A shows an exemplary network arrangement that may be modeled or emulated. A first subnet 202 is formed by processing nodes $PN_1$, $PN_2$, and $PN_k$ that may communicate with one another via switch 206. A second subnet 204 is formed by processing nodes $PN_k$ and $PN_m$ that may communicate with one another via switch 208. Under switched Ethernet semantics, one node on a subnet may communicate directly with another node on the subnet; for example, $PN_1$ may send a message to $PN_2$. The semantics also allow one node to communicate with a set of the other nodes; for example $PN_1$ may send a broadcast message to other nodes. The processing nodes $PN_1$ and $PN_2$ cannot directly communicate with $PN_m$ because $PN_m$ is on a different subnet. For $PN_1$ and $PN_2$ to communicate with $PN_m$ higher layer networking software would need to be utilized, which software would have a fuller understanding of both subnets. Though not shown in the figure, a given switch may communicate via an "uplink" to another switch or the like. As will be appreciated given the description below, the need for such uplinks is different than their need when the switches are physical. Specifically, since the switches are virtual and modeled in software they may scale horizontally as wide as needed. (In contrast, physical switches have a fixed number of physical ports sometimes the uplinks are needed to provide horizontal scalability.)

Figure 2B:
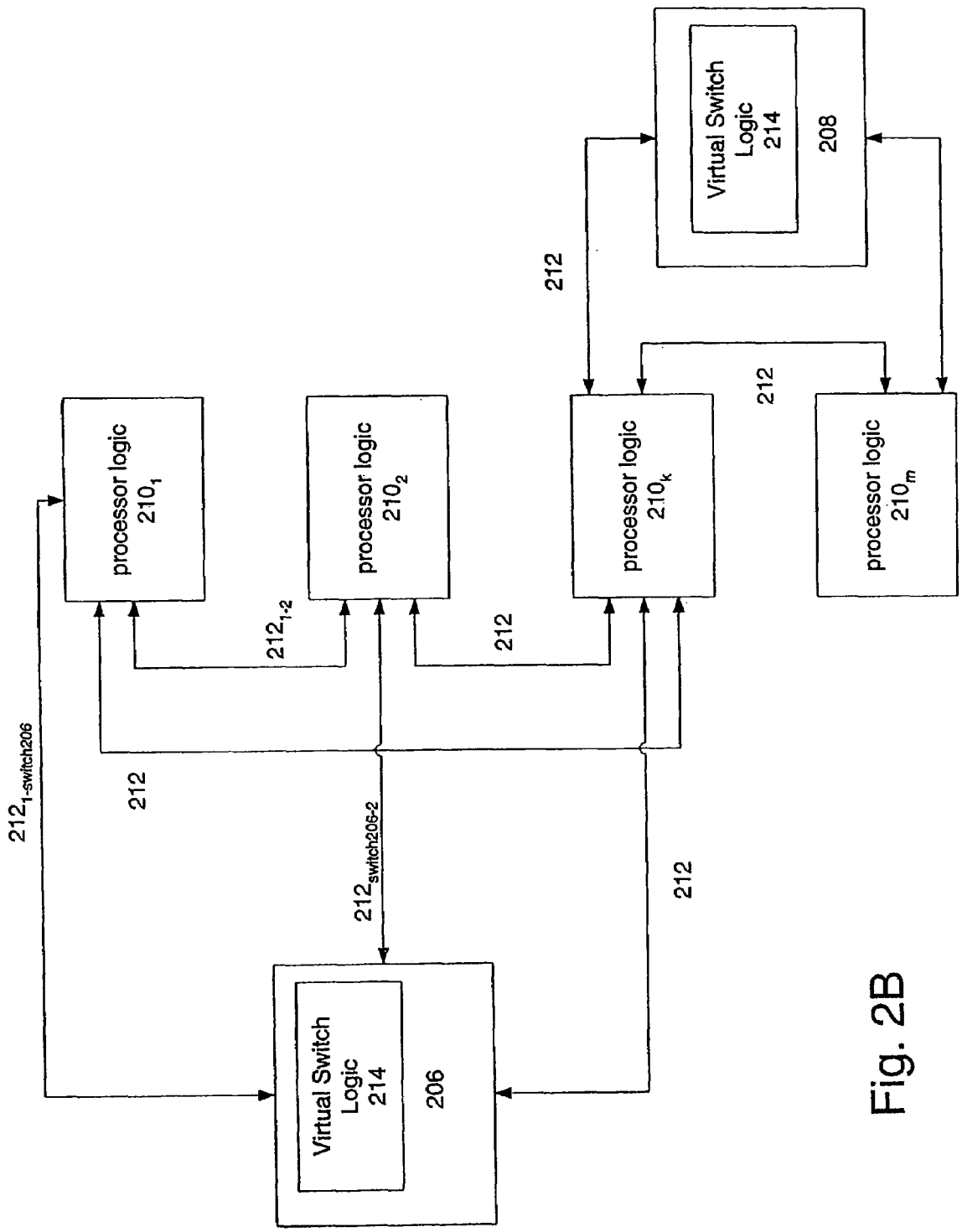

FIG. 2B shows exemplary software communication paths and logic used under certain embodiments to model the subnets 202 and 204 of FIG. 2A. The communication paths 212 connect processing nodes $PN_1$, $PN_2$, $PN_k$, and $PN_m$, specifically their corresponding processor-side network communication logic 210, and they also connect processing nodes to control nodes. (Though drawn as a single instance of logic for the purpose of clarity, $PN_k$ may have multiple instances of the corresponding processor logic, one per subnet, for example.) Under preferred embodiments, management logic and the control node logic are responsible for establishing, managing and destroying the communication paths. The individual processing nodes are not permitted to establish such paths.

As will be explained in detail below, the processor logic and the control node logic together emulate switched Ethernet semantics over such communication paths. For example, the control nodes have control node-side virtual switch logic 214 to emulate some (but not necessarily all) of the semantics of an Ethernet switch, and the processor logic includes logic to emulate some (but not necessarily all) of the semantics of an Ethernet driver.

Within a subnet, one processor node may communicate directly with another via a corresponding virtual interface 212. Likewise, a processor node may communicate with the control node logic via a separate virtual interface. Under certain embodiments, the underlying switch fabric and associated logic (e.g., switch fabric manager logic, not shown) provides the ability to establish and manage such virtual interfaces (VIs) over the point to point mesh. Moreover, these virtual interfaces may be established in a reliable, redundant fashion and are referred to herein in as RVIs. At points in this description, the terms virtual interface (VI) and reliable virtual interface (RVI) are used interchangeably, as the choice between a VI versus an RVI largely depends on the amount of reliability desired by the system at the expense of system resources.

Referring conjointly to FIGS. 2A-B, if node $PN_1$ is to communicate with node $PN_2$ it does so ordinarily by virtual interface $212_{1-2}$. However, preferred embodiments allow communication between $PN_1$ and $PN_2$ to occur via switch emulation logic, if for example VI $212_{1-2}$ is not operating satisfactorily. In this case a message may be sent via VI $212_{1-switch206}$ and via VI $212_{switch206-2}$. If $PN_1$ is to broadcast or multicast a message to other nodes in the subnet 202 it does so by sending the message to control node-side logic 214 via virtual interface $212_{1-switch206}$. Control node-side logic 214 then emulates the broadcast or multicast functionality by cloning and sending the message to the other relevant nodes using the relevant VIs. The same or analogous VIs may be used to convey other messages requiring control node-side logic. For example, as will be described below, control node-side logic includes logic to support the address resolution protocol (ARP), and VIs are used to communicate ARP replies and requests to the control node. Though the above description suggests just one VI between processor logic and control logic, many embodiments employ several such connections. Moreover, though the figures suggest symmetry in the software communication paths, the architecture actually allows asymmetric communication. For example, as will be discussed below, for communication clustered services the packets would be routed via the control node. However, return communication may be direct between nodes.

Notice that like the network of FIG. 2A, there is no mechanism for communication between node $PN_2$, and $PN_m$. Moreover, by having communication paths managed and created centrally (instead of via the processing nodes) such a path is not creatable by the processing nodes, and the defined subnet connectivity cannot be violated by a processor.

Figure 2C:
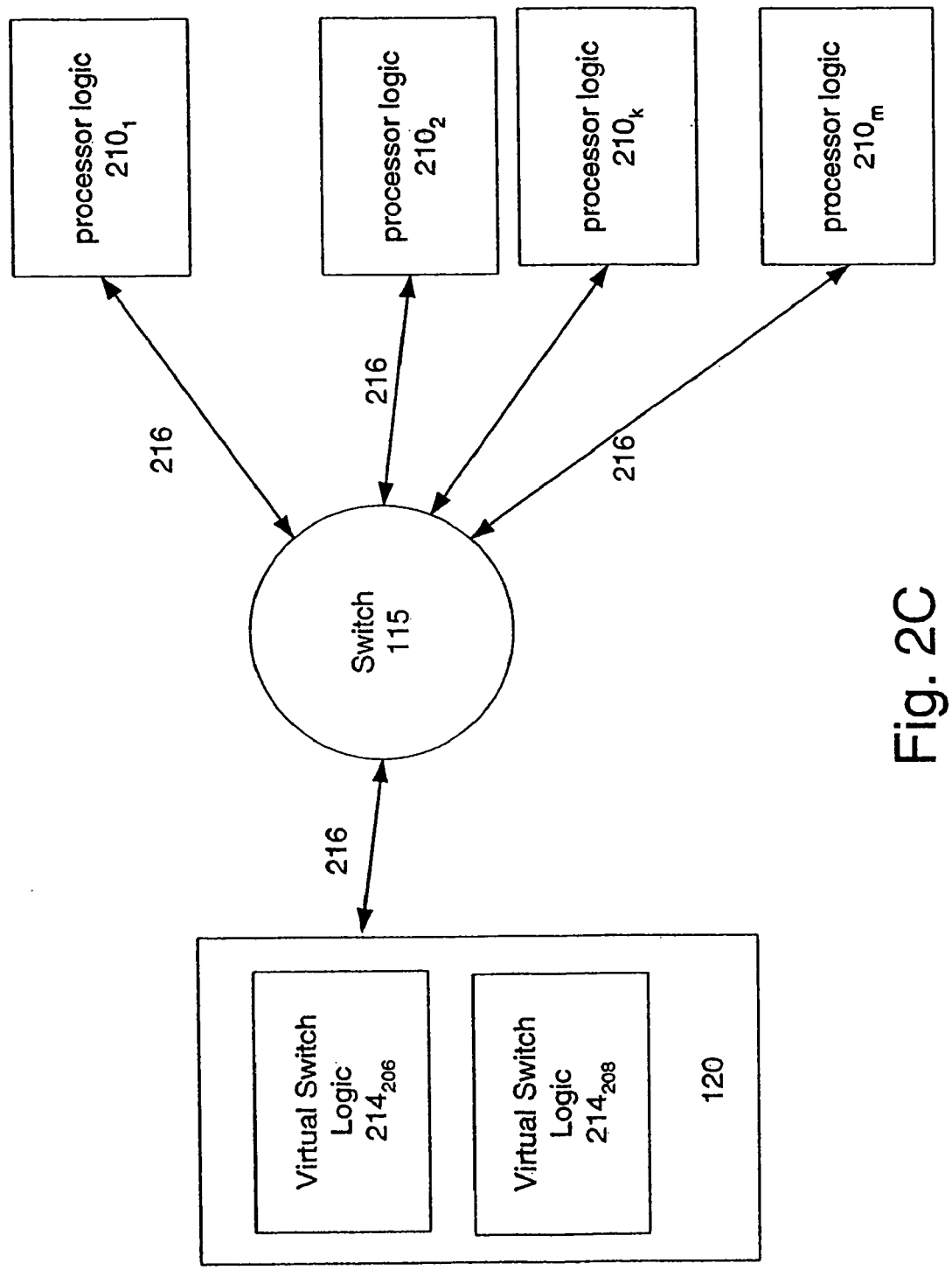
Figure 3:
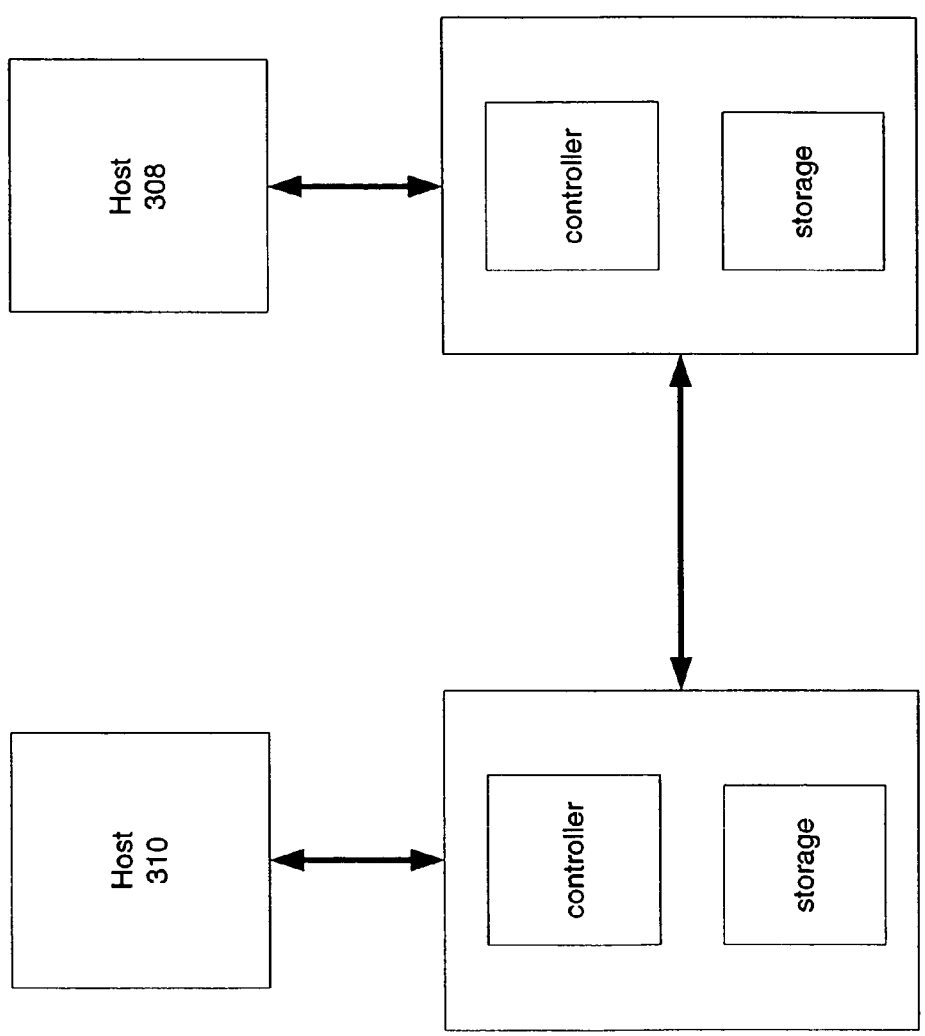
FIG. 3 illustrates a conventional disaster recovery system.

FIG. 2C shows the exemplary physical connections of certain embodiments to realize the subnets of FIGS. 2A and B. Specifically, each instance of processing network logic 210 communicates with the switch fabric 115 via a PtP links 216 of interconnect 110. Likewise, the control node has multiple instances of switch logic 214 and each communicates over a PtP connection 216 to the switch fabric. The virtual interfaces of FIG. 2B include the logic to convey information over these physical links, as will be described further below.

To create and configure such networks, an administrator defines the network topology of a PAN and specifies (e.g., via a utility within the management software 135) MAC address assignments of the various nodes. The MAC address is virtual, identifying a virtual interface, and not tied to any specific physical node. Under certain embodiments, MAC addresses follow the IEEE 48 bit address format, but in which the contents include a "locally administered" bit (set to 1), the serial number of the control node 120 on which the virtual interface was originally defined (more below), and a count value from a persistent sequence counter on the control node that is kept in NVRAM in the control node. These MACs will be used to identify the nodes (as is conventional) at a layer 2 level. For example, in replying to ARP requests (whether from a node internal to the PAN or on an external network) these MACs will be included in the ARP reply.

The control node-side networking logic maintains data structures that contain information reflecting the connectivity of the LAN (e.g., which nodes may communicate to which other nodes). The control node logic also allocates and assigns VI (or RVI) mappings to the defined MAC addresses and allocates and assigns VIs or (RVIs) between the control nodes and between the control nodes and the processing nodes. In the example of FIG. 2A, the logic would allocate and assign VIs 212 of FIG. 2B. (The naming of the VIs and RVIs in some embodiments is a consequence of the switching fabric and the switch fabric manager logic employed.)

As each processor boots, BIOS-based boot logic initializes each processor 106 of the node 105 and, among other things, establishes a (or discovers the) VI 212 to the control node logic. The processor node then obtains from the control node relevant data link information, such as the processor node's MAC address, and the MAC identities of other devices within the same data link configuration. Each processor then registers its IP address with the control node, which then binds the IP address to the node and an RVI (e.g., the RVI on which the registration arrived). In this fashion, the control node will be able to bind IP addresses for each virtual MAC for each node on a subnet. In addition to the above, the processor node also obtains the RVI or VI-related information for its connections to other nodes or to control node networking logic.

Thus, after boot and initialization, the various processor nodes should understand their layer 2, data link connectivity. As will be explained below, layer 3 (IP) connectivity and specifically layer 3 to layer 2 associations are determined during normal processing of the processors as a consequence of the address resolution protocol.

It should be appreciated that platforms other than that outlined above may be used. That is, other arrangements of configurable platforms may also be utilized though the internal architectures and capabilities may differ. For example, the preferred platform includes particular types of emulation logic in connection with its supported PAN network functionality. Though this logic is believed to offer certain advantages, it is not necessary for the present invention.

Configuration State

In connection with the above, the deployed PANs on the configurable platform are characterized by configuration state. The configuration state at a minimum describes the processing topology that is to be emulated. For example, the state would describe the topology of an exemplary arrangement such as FIG. 4 and could include specific information about the storage personality, applications, etc. As outlined above, under preferred embodiments, the primary site utilizes a compatible configurable platform to that at the fail-over site. In these contexts, the configuration state may include more information than the mere processing topology. The extra information may include information specific to the emulation of the conventional arrangement and would facilitate instantiation at the failover site. For example, the configuration state may include platform specific information on how to emulate a specific network interconnection.

As outlined above, configuration state may specify all processing resources at the primary site, or it may specify only specific PANs, clusters or partitions. Under one certain embodiment, the configuration state includes the following types of information.

Configuration State mirrored as part of a PAN Archive (PAR file)

Data specific to the device configuration at the primary site: E.g.,
   State of the 1 Gb eth devices:
      Name, switch uplink information filter mode, MAC address
   State of the virtual redundant ethernet devices (Reths)
      Name, 1 GB eth pairings, operating modes, primary eth, soft MAC address
   State of the virtual network switches
      Switch name, uplink information (eth or reth), DHCP proxy information, Router information
   Root and Boot images for creating Server root disks and booting Server kernels Data specific to the blade pooling information at the primary site
   List of Blades assigned to the global Blade pool Data related to the management of the primary site:
   SNMP settings for the primary BladeFrame and PAN
      SNMP Manager IP addresses
      Community Strings
      Trap IP ports
   User Security Setttings
      User names and roles
   Event/Alert settings
      Severities necessary to trigger alerts for various events
      Email addresses to which alerts should be sent
      SNMP trap enablements for specific alerts
   Monitor settings
      Default thresholds for various monitors in the system
   Email gateway
   Disaster recovery state save settings
      State save schedule, output location (device or file)

Data related to the logical partitioning of the primary site (PAN and/or logical partitions or logical PANs)
   For each LPAN
      LPAN name, description
      Management settings
         SNMP settings specific to the LPAN
            SNMP Manager IP addresses
            Community Strings
            Trap IP ports
      Event/Alert settings
         Severities necessary to trigger alerts for various events
         Email addresses to which alerts should be sent
         SNMP trap enablements for specific alerts
      Activation order (order in which this LPAN is started relative to other LPANs—establishes priority for acquiring resources)
      Resource information
         Blades assigned to the LPAN, access to the global pool
         Blades assigned to a local pool within the LPAN
         SCSI disk Ids assigned to the LPAN
         Virtual Switches assigned to the LPAN
         Access settings for bladeframe CD-ROM usage
      Server configuration
         For each Server
         Server name, description
         Required/Optional settings (affects LPAN boot operations)
         Timeouts for boot, shutdown, reboot Primary and failover Blade configurations
Attach settings of LPAN SCSI disk ids to Server disk ids
Disk enable on boot settings, optional/required attributes
Virtual eth settings (MAC address, data rate)
Attach settings of LPAN virtual switches to Server virtual eths
CD-ROM enablements
Boot Information
  Boot image to use
  Kernel arguments to use when booting
  Boot order for the Server relative to other Servers in the LPAN
HA Application Information
  HA Application resources
    IP resources
    File system resources
    Failover policies
  For each HA Application configured in the LPAN
    Application name, description, type
      Attributes: auto-start, start order (with respect to other applications), start/stop scripts Under some embodiments, the configuration state is specified with predefined rules. For example the state may be stored as tagged data using XML. This facilitates parsing and validation of the specification and may facilitate automatic generation of software commands to deploy the specified configuration.

High available applications include fail-over applications, load balancing applications, and the like.

On the issue of XML format. The tags usually represent the names of an object (LPAN, pServer, SNMP Manager, etc) and XML attributes are usually used for specific values, i.e. name="pServer1", so for example:

```
<pServer name="pServer1">
    <pBlades>
        <primary name="bladeframeX/p12/>
        <failover name="bladeframeX/p9/>
        ...
    </pBlades>
    <disk id="(1.0)" san-id="(5.0..0.1)"/>
    ...
</pServer>
```

In some cases, an administrator may use the specification as a description of the processing resources that should be instantiated on the failover site, but may find it necessary to alter the information to specify a different but still sufficient failover arrangement.

Preferred embodiments include tools to validate that the description of the processing resources is a valid description.

As mentioned above, certain preformed embodiments are used in conjunction with an architecture like that described in U.S. patent application Ser. No. 10/038,354. Consequently, the configuration state for such whether for PANs or logical PANs is saved and archived as described above.

Certain embodiments persist the PAN Archives to raw disks. This allows the system to write the data at the primary site and read it back at the failover site without requiring file system mounts (which may be hard to use on shared disks).

It will be appreciated that the scope of the present invention is not limited to the above described embodiments, but rather is defined by the appended claims; and that these claims will encompass modifications of and improvements to what has been described.

What is claimed is:

1. A method of providing processing resources to respond to a fail-over condition in which a primary site includes a configuration of processing resources, comprising:
generating a specification that describes a configuration of processing resources of the primary site;
providing the specification to a fail-over site having a configurable processing platform capable of deploying processing area networks in response to software commands;
using the specification to generate software commands to the configurable platform to deploy processing resources corresponding to the specification,
wherein the processing resources at the primary site include a plurality of independent processing area networks and wherein the specification describes only a subset of the plurality of independent processing area networks, wherein at least one other site includes processing resources and
wherein a specification is generated to describe the configuration of processing resources at the at least one other site; and
wherein the specification of the configuration of processing resources at the at least one other site is provided to the fail-over site; and
wherein at least one of the specifications is used to generate software commands to the configurable platform to deploy processing area network corresponding to the one specification.

2. A method of providing processing resources to respond to a fail-over condition in which a primary site includes a configuration of processing resources, comprising:
generating a specification that describes a configuration of processing resources of the primary site;
providing the specification to a fail-over site having a configurable processing platform capable of deploying processing area networks in response to software commands;
using the specification to generate software commands to the configurable platform to deploy processing resources corresponding to the specification, wherein the act of generating includes specifying at least (a) one or more devices that are constituents of the primary site, and (b) how the devices are connected to each other.

3. A method of providing processing resources to respond to a fail-over condition in which a primary site includes a configuration of processing resources, comprising:
generating a specification that describes a configuration of processing resources of the primary site said configuration including a network topology of a processing area network with defined connectivity;
providing the specification to a fail-over site having a configurable processing platform capable of deploying processing area networks in response to software commands;
using the specification to generate software commands to the configurable platform to deploy processing resources corresponding to the specification including deploying a processing area network with specified topology and defined connectivity.

4. A system of providing processing resources to respond to a fail-over condition in which a primary site includes a configuration of processing resources, comprising:

a computer-readable specification that describes a configuration of processing resources of the primary site said configuration including a network topology of a processing area network with defined connectivity;

a configurable processing platform capable of deploying processing area networks in response to software commands;

logic to generate software commands to the configurable platform to deploy processing resources corresponding to the specification including deploying a processing area network with specified topology and defined connectivity.

5. A method of providing processing resources to respond to a fail-over condition in which a primary site includes a configuration of processing resources, comprising:

generating a specification that describes a configuration of processing resources of the primary site;

providing the specification to a fail-over site having a configurable processing platform capable of deploying processing area networks in response to software commands;

using the specification to generate software commands to the configurable platform to deploy processing resources corresponding to the specification;

wherein the processing resources at the primary site include a plurality of independent processing area networks and wherein the specification describes all of the independent processing area networks, wherein at least one other site includes processing resources and wherein a specification is generated to describe the configuration of processing resources at the at least one other site; and wherein the specification of the configuration of processing resources at the at least one other site is provided to the fail-over site; and wherein at least one of the specifications is used to generate software commands to the configurable platform to deploy processing area network corresponding to the one specification.

* * * * *